(12) United States Patent
Bucher et al.

(10) Patent No.: US 7,575,349 B2
(45) Date of Patent: Aug. 18, 2009

(54) VEHICULAR LIGHTING FIXTURE WITH NON-DIRECTIONAL DISPERSION OF LIGHT

(75) Inventors: Lloyd Keith Bucher, Livingston, TN (US); James Burr Anderson, Jr., Cookeville, TN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 160 days.

(21) Appl. No.: 11/182,092

(22) Filed: Jul. 15, 2005

(65) Prior Publication Data

US 2006/0012307 A1  Jan. 19, 2006

Related U.S. Application Data

(60) Provisional application No. 60/588,481, filed on Jul. 16, 2004.

(51) Int. Cl.
 *B60Q 1/26* (2006.01)
(52) U.S. Cl. .......................... 362/503; 362/84; 362/231; 362/541; 362/545; 40/543; 40/593
(58) Field of Classification Search ................. 362/30, 362/84, 34, 234, 20, 228, 229, 230, 231, 362/293, 604, 503, 510, 540–545, 800, 812; 250/483.1, 461.1, 462.1; 40/543, 542, 556, 40/560, 564, 575, 593; 315/77
See application file for complete search history.

(56) References Cited

U.S. PATENT DOCUMENTS

| 1,415,595 | A |   | 5/1922  | McGrath |         |
|-----------|---|---|---------|---------|---------|
| 1,667,772 | A |   | 5/1928  | Coon    |         |
| 2,015,170 | A | * | 9/1935  | Ward    | 40/543  |
| 2,879,614 | A | * | 3/1959  | Baldanza | 40/543 |
| 4,383,290 | A |   | 5/1983  | Binder et al. | 362/290 |
| 4,733,335 | A |   | 3/1988  | Serizawa et al. | 362/80 |
| 4,744,012 | A | * | 5/1988  | Bergkvist | 362/84 |
| 5,347,435 | A | * | 9/1994  | Smith et al. | 362/503 |
| 5,400,225 | A | * | 3/1995  | Currie  | 362/554 |
| 5,607,222 | A | * | 3/1997  | Woog    | 362/84  |
| 6,309,753 | B1 | * | 10/2001 | Grossman et al. | 428/428 |
| 6,554,462 | B2 |   | 4/2003  | Hulse et al. | 362/551 |
| 6,592,238 | B2 |   | 7/2003  | Cleaver et al. | 362/249 |

(Continued)

*Primary Examiner*—Anabel Ton
*Assistant Examiner*—Kevin J. Spinella
(74) *Attorney, Agent, or Firm*—Robert L. Stearns; Dickinson Wright PLLC

(57) ABSTRACT

A CHMSL (16) or other lighting system feature of an automobile (10) includes a feature for presenting personal expressions in the form of words or symbols but is automatically deactivated when the regular vehicle lighting system is in use. The personal expression is fixed in a tangible medium by way of phosphor-coated indicia (34) placed within a UV impervious housing (18). A secondary UV light source (36) selectively energizes the phosphor-coated indicia (34) so that the irradiated material glows and is visible through a light transmissive screen (20). The light transmissive screen (20) is provided with a UV blocking agent so that harmful UV rays do not escape the housing (18). The phosphor-coated indicia (34) can be mounted on a removable transparent plate (30), on light dispersion optics (24, 26), or on the inner face of the light transmissive screen (20). A control circuit (42") manages the primary light source (22) and the secondary UV light source (36) so that only one of the light sources can be energized at any one time.

12 Claims, 4 Drawing Sheets

U.S. PATENT DOCUMENTS

| | | | |
|---|---|---|---|
| 6,619,825 B2 | 9/2003 | Natsume | 362/509 |
| 2002/0191386 A1 | 12/2002 | Cleaver et al. | 362/31 |
| 2003/0198046 A1 | 10/2003 | Cleaver et al. | 362/235 |
| 2004/0012976 A1 | 1/2004 | Amano | 362/511 |
| 2004/0120019 A1 | 6/2004 | Chou | 359/1 |

* cited by examiner

US 7,575,349 B2

VEHICULAR LIGHTING FIXTURE WITH NON-DIRECTIONAL DISPERSION OF LIGHT

This invention claims priority to U.S. Provisional Patent Application No. 60/588,481, filed Jul. 16, 2004.

BACKGROUND OF THE INVENTION

1. Field of the Invention

An ultraviolet light induced indicia for a motor vehicle, and more particularly, a stop or other external lighting system capable of displaying a UV light induced indicia when not in regular use as a stop or other light feature.

2. Related Art

Center high mounted stop lamp (CHMSL) assemblies for motor vehicles are one example of a regular light assembly having a primary purpose in this case of indicating a braking condition. CHMSL's are typically mounted in the rear window, or on the rear deck, of an automobile and are wired to light an elongated generally rectangular region with the brake-light system. They provide increased visibility to the brake-light system, and thus comprise an important part of the vehicle safety system.

Bumper stickers and other rear vehicle signage have become an accepted part of self-expression. Most bumper stickers or other signage, however, are difficult to perceive at night or in other low level light conditions. Thus, the self-expression of an individual through the medium of vehicle signage and bumper stickers is generally limited to daylight conditions. Furthermore, the available space for self-expression indicia is somewhat limited on the rearward surface of the vehicle. For example, it is not possible to cover the spaces reserved for CHMSL and other lighting features because of the safety issues.

Any device or technique which is aesthetically pleasing would be readily accepted within the automobile industry. Thus, there exists a need for an improved, aesthetically appealing technique to present signage, indicia, or other forms of expression on the rear of a vehicle, and particularly during nighttime conditions and in regions of the vehicle surface not heretofore available.

SUMMARY OF THE INVENTION

A motor vehicle is provided having a rearwardly facing exterior surface. The vehicle comprises a housing having a light transmissive screen presented toward the rearwardly facing exterior surface. A primary visible light source is disposed in the housing for projecting visible light along a path toward the light transmissive screen. Phosphor-coated indicia are disposed in the housing and are positioned in the light path. A secondary ultraviolet light source within the housing is selectively energized for projecting ultraviolet light onto the phosphor-coated indicia to produce a visually interesting display through the light transmissive screen for the benefit of viewers positioned rearwardly of the vehicle.

A vehicular lighting system according to this construction is particularly advantageous. New regions of the rearwardly facing exterior surface of the vehicle are made available for presenting signage or other expressive indicia. The primary visible light source can be a feature of the vehicle rearward lighting system such as used for brake lights, signal lights, marker lights, or other use. Thus, this novel vehicular lighting fixture advantageously combines in a single housing, a traditional vehicular lighting feature operated through the primary visible light source, as well as a secondary phosphor-coated indicia via activation of a secondary ultraviolet light source within the same housing.

According to another aspect of the invention, a method for selectively presenting lighted indicia from an automobile comprises the steps of: containing a primary visible light source, a secondary ultraviolet light source, and a phosphor-coated indicia within an ultraviolet light impervious housing; irradiating the phosphor-coated indicia with ultraviolet light while the primary visible light source remains inactive; and automatically de-energizing the secondary ultraviolet light source in response to energizing the primary visible light source.

The method of the invention controls conflict between the primary and secondary uses of the lighting fixture by automatically de-energizing the secondary ultraviolet light source whenever the lighting fixture is needed for its primary purpose.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
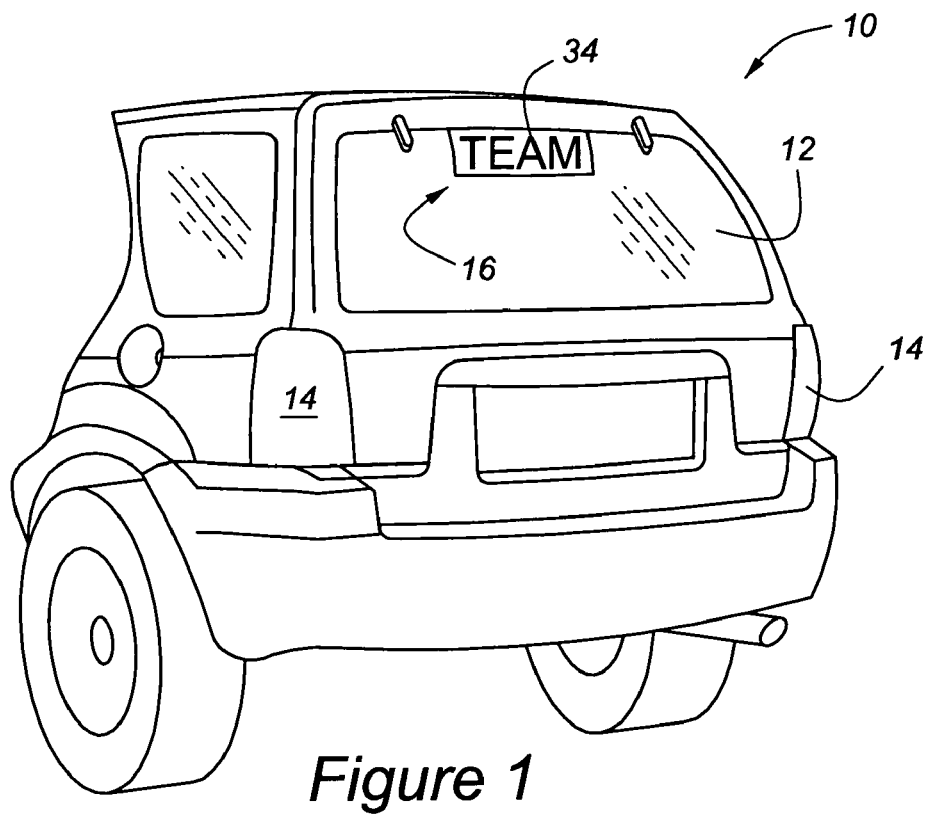
FIG. 1 is a perspective view of an automobile including a CHMSL assembly mounted above its rear window.

Referring to the figures, wherein like numerals indicate like or corresponding parts throughout the several views, a representative automobile is generally shown at 10 in FIG. 1. The automobile 10 includes a rearwardly facing exterior surface which includes a rear window 12, a pair of rear brake light assemblies 14, and other standard features. A CHMSL assembly, generally indicated at 16, is supported for viewing through the rear window 12. When a driver touches the brake pedal and thus activates the braking system, the CHMSL assembly 16 is energized, together with the brake lights 14, to illuminate an elongated, generally rectangular red region signaling rearward drivers of a brake-induced deceleration.

Figure 2:
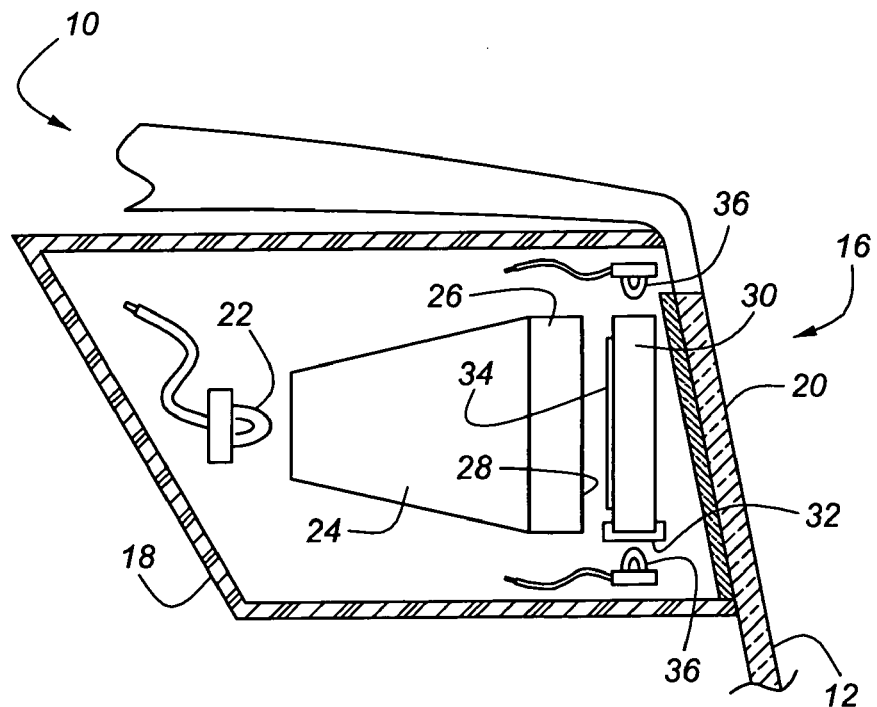
FIG. 2 is a simplified cross-section showing a first embodiment of the subject invention.

Referring to FIG. 2, the CHMSL 16 includes a housing 18 which is mounted or fixed to the vehicle 10. In some vehicles, the housing 18 will be suspended from the inner roof or headliner portion, whereas in other vehicles the housing 18 will be mounted on a rear deck lid or exterior of the vehicle on the trunk lid. Alternatively, the housing 18 need not be a part of the CHMSL 16 per se. Rather, it can be incorporated into a dome light assembly, a rear brake light assembly, or other such structure. The housing 18 includes a light transmissive screen 20 presented in the rearwardly facing direction. Typically, although not necessarily, the light transmissive screen 20 will comprise the closing end of the housing 18 through which only visible light may pass. The light transmissive screen 20 can possess optical characteristics, such as lensing or coloration attributes as may be deemed necessary. Furthermore, the light transmissive screen 20 can, in some circumstances, be formed integrally with the rear window 12 of the vehicle 10.

One or more primary visible light sources 22 are disposed in the housing 18 for projecting visible light along a path toward the light transmissive screen 20. In the preferred embodiment, the primary visible light source comprises an array of light emitting diodes (LED's) or other light generating elements having favorable power consumption, size and temperature attributes. Notwithstanding, a single light source 22 of sufficient light output intensity could be used with similar effectiveness. The primary light source 22 is positioned within the housing 18, horizontally transverse within the automobile 10, such that the light emitted from the light sources 22 is projected into a translucent material having a shape which causes the light to spread and reflect within it. The translucent material shape may be in the form of a collector 24 and a diffuser 26, joined end-to-end with or without gap between. The collector 24 and diffuser 26 may be made from a silicone material, although other materials known to those skilled in the art may also be used such as epoxy or urethane or opaque materials.

The combination diffuser 26 and collector 24 are structured to help evenly mix and spread the light patterns from the multiple light sources 22, and direct these light patterns through an exit face 28 of the diffuser 26. Although shown in the drawings as a single piece, the collector 24/diffuser 26 can be spaced one from another and can also be designed as an array of multiple sub-units serving each one or two individual light sources 22.

Light emanating from the exit face 28, along the path of light, passes into another optical feature in the form of a substantially transparent plate 30. The transparent plate 30 can be permanently affixed in the housing 18, or more preferably can be removably supported on an interchange mechanism 32 that will allow convenient, user friendly substitution with a different transparent plate 30. A phosphor-coated indicia is disposed on one face of the transparent plate 30. Phosphor materials such a strontium, zinc, cadmium sulfides, or any other material or pigment that absorbs light energy and radiates visible light when exposed to ultraviolet light can be used. Different phosphor materials and blends of materials can be selected to radiate different visible light colors. Regardless of the particular phosphor material chosen, it is preferably of a type which is generally transparent or invisible in the absence of ultraviolet light.

A secondary ultraviolet light source 36 is also provided within the housing 18. The secondary ultraviolet light source 36 is selectively energized to project ultraviolet light onto the phosphor-coated indicia 34 to produce a visually interesting display through the light transmissive screen 20 for the benefit of viewers positioned rearwardly of the vehicle. Thus, when the secondary ultraviolet light source 36 is activated, the phosphor-coated indicia 34 absorbs light energy at the relevant wave lengths and then radiates visible light. Light colorations for the primary light source 22, such as "red" for stop light applications, will be created in the light path upstream of the indicia 34 so as not to affect or alter the visual distinctiveness of the glowing indicia 34. For example, the red color for a stop light application can be achieved through a red light emitting primary light source 22, or coloring agents or films used with the collector 24/diffuser 26.

The light transmissive screen 20 can be provided with an ultraviolet light blocking agent so that UV light cannot escape from the housing 18. The remainder of the housing 18 is also made from a material impervious to the passage of ultraviolet light. By this means, UV light emitted from the secondary light source 36 is completely undetectable to an outside observer. Nevertheless, the UV light causes the phosphor-coated indicia 34 to glow with visible light colors rendering an impressive visual effect. The UV blocking agent incorporated into the light transmissive screen 20 can be in the form of a film applied to the inner surface of the screen 20, as depicted in FIG. 2, or the light transmissive screen 20 can be doped with an appropriate UV blocking material. Other techniques may also be employed.

Figure 3:
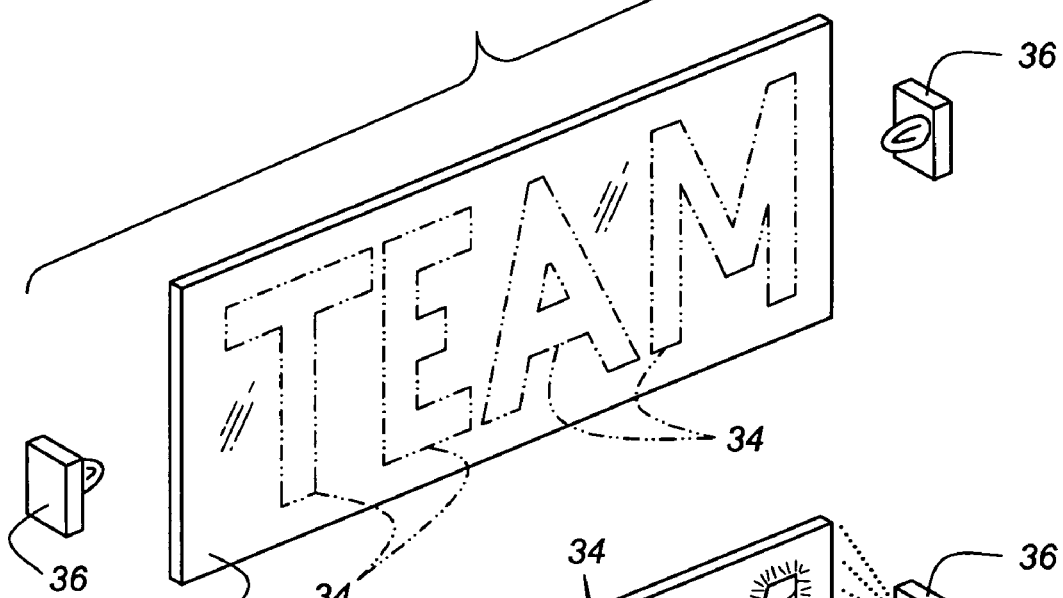
FIG. 3 is a simplified view showing the phosphor-coated indicia in a transparent, inactive state with flanking UV light sources in a de-energized condition.
Figure 4:
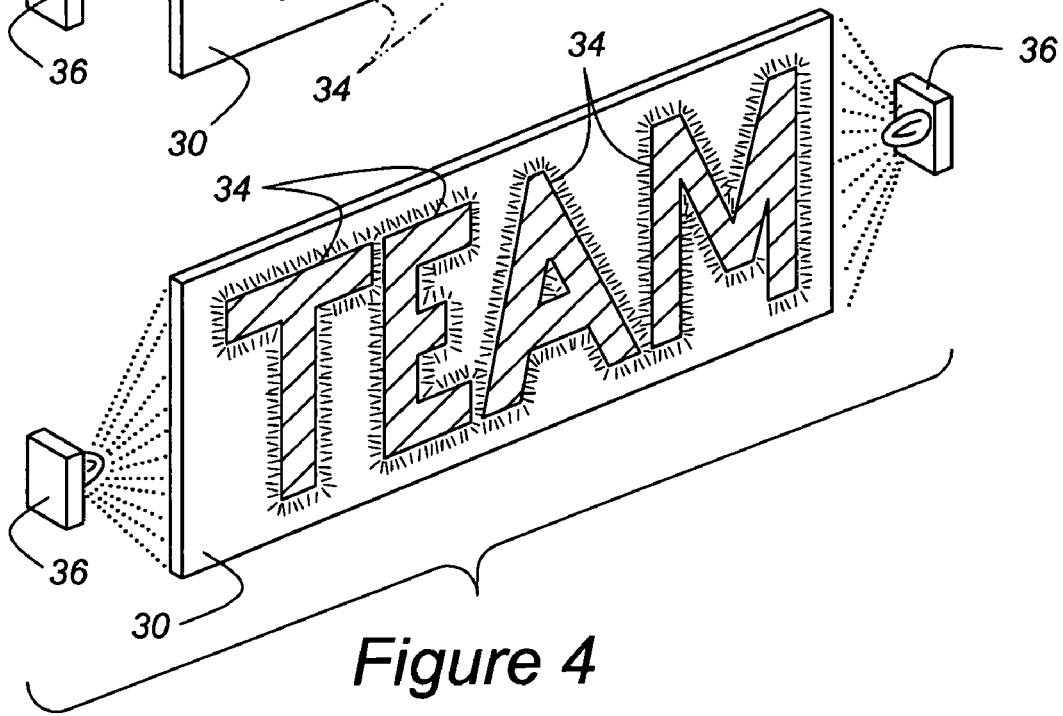
FIG. 4 is a view as in FIG. 3, but showing the phosphor-coated indicia as irradiated by the ultraviolet light sources to emit an appealing visible light color.

FIG. 3 is a simplified perspective view of the transparent plate 30 with the phosphor-coated indicia 34 being arranged to form the arbitrary and exemplary word "TEAM". Here, the secondary ultraviolet light sources 36 are shown in an inactive state, and as a result the phosphor-coated indicia 34 are substantially invisible or undetectable to an outside observer. Accordingly, if the CHMSL 16 is activated with the brake light system, light from the primary light source 22, acting through the collector 24/diffuser 26, is projected through the light transmissive screen 20 without the phosphor-coated indicia being noticeable. However, when the secondary ultraviolet light sources 36 are energized, as shown in FIG. 4, the UV light irradiates the phosphor-coated indicia 34 causing it to glow. Thus, observers, particularly those positioned rearwardly of the automobile 10, would be able to discern the phosphor-coated indicia 34, especially at night, and thus appreciate the intended expression. Preferably, the glowing indicia 34 can remain energized at the same time as the primary light source 22 without adversely affecting the color output from the primary light source 22. Thus, if the primary light source 22 operates as a red stop like, for example, then the indicia 34 can remain glowing without unduly changing the red color perceived by an observer. However, if the color alternation is not acceptable, a control circuit can be used to electronically interconnect the primary visible light source 22 and the secondary ultraviolet light source 36 in such a manner that the secondary ultraviolet light source 36 can only be energized when the primary visible light source 22 is de-energized. Thus, conflicts between the two lighting systems, operating through the common CHMSL assembly 16 and housing 18 are never problematic.

Figure 5:
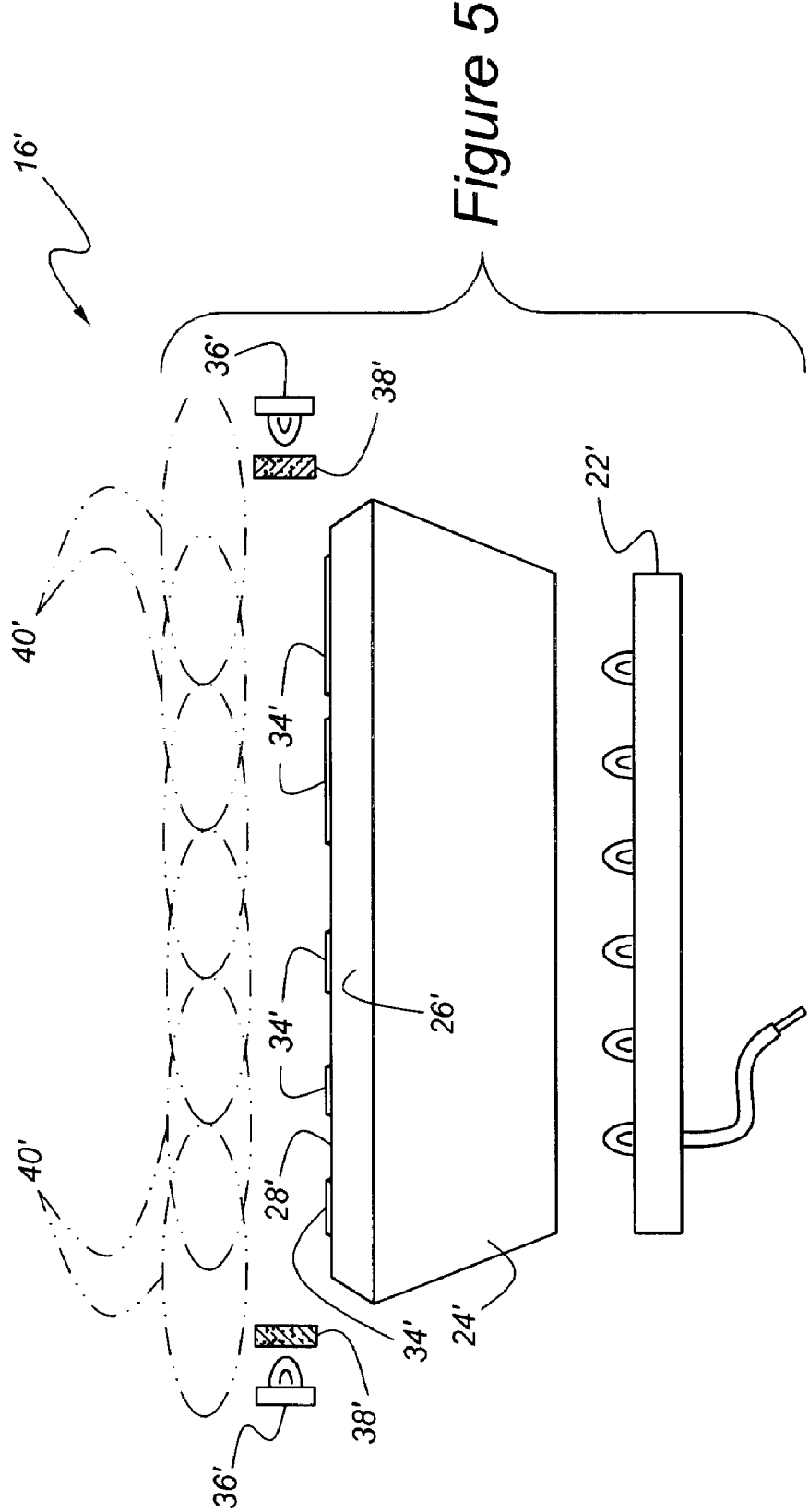
FIG. 5 is a schematic view showing an alternative embodiment of the subject invention with the phosphor-coated indicia being affixed to diffusion optics.

Referring now to FIG. 5, a first alternative embodiment of the invention is depicted. For convenience, prime (') designations are used with corresponding previous reference numerals in this example. Here, the CHMSL assembly 16' includes a primary light source 22' positioned adjacent a collector 24' and diffuser 26'. These features are similar in design and functionality to the previous embodiment. In this application, however, the transparent plate 30 is omitted and the phosphor-coated indicia 34' is affixed directly to the exit face 28' of the diffuser 26'. Optical UV filters 38' may be positioned between the secondary UV light sources 36' and the phosphor-coated indicia 34'. The UV filters 38' allow UV light of a predetermined wave length only to pass through. For example, a typical UV light wave length might be 365 nm. Thus, when energized, the UV light source 36' may produce light within a wide range of wave lengths, however the filter 38' will only allow light at the 365 nm wave length to pass through to the phosphor-coated indicia 34'. In some circumstances, this may be beneficial. Phosphor-coated indicia 34' of differing compositions, and responsive to UV light in different wave lengths, may be applied in concert with different UV filters 38' to achieve additional lighting effects. If the phosphor-coated indicia is selectively chosen so that its phosphor material is reactive to UV radiation at one wave length but not affected by UV light at another wave length, the multiple UV filters 38' and their secondary UV light sources 36' can be selectively energized to excite only portions of the phosphor-coated indicia 34' at any given time. Thus, multiple expressions can be achieved through a single system.

FIG. 5 also illustrates the smooth dispersion of the light rays emanating from the primary light sources 22 by way of their projected beam patterns 40'. As illustrated here, the beam patterns 40' are in the form of even, elliptical spreading which results in a smooth optical presentation to drivers traveling behind the automobile 10. It will be appreciated, however, that other non-elliptical lighting patterns can be achieved by optimizing the design of the collector 24' and diffuser 26', and/or by incorporating a lens or reflector into the optical system.

Figure 6:
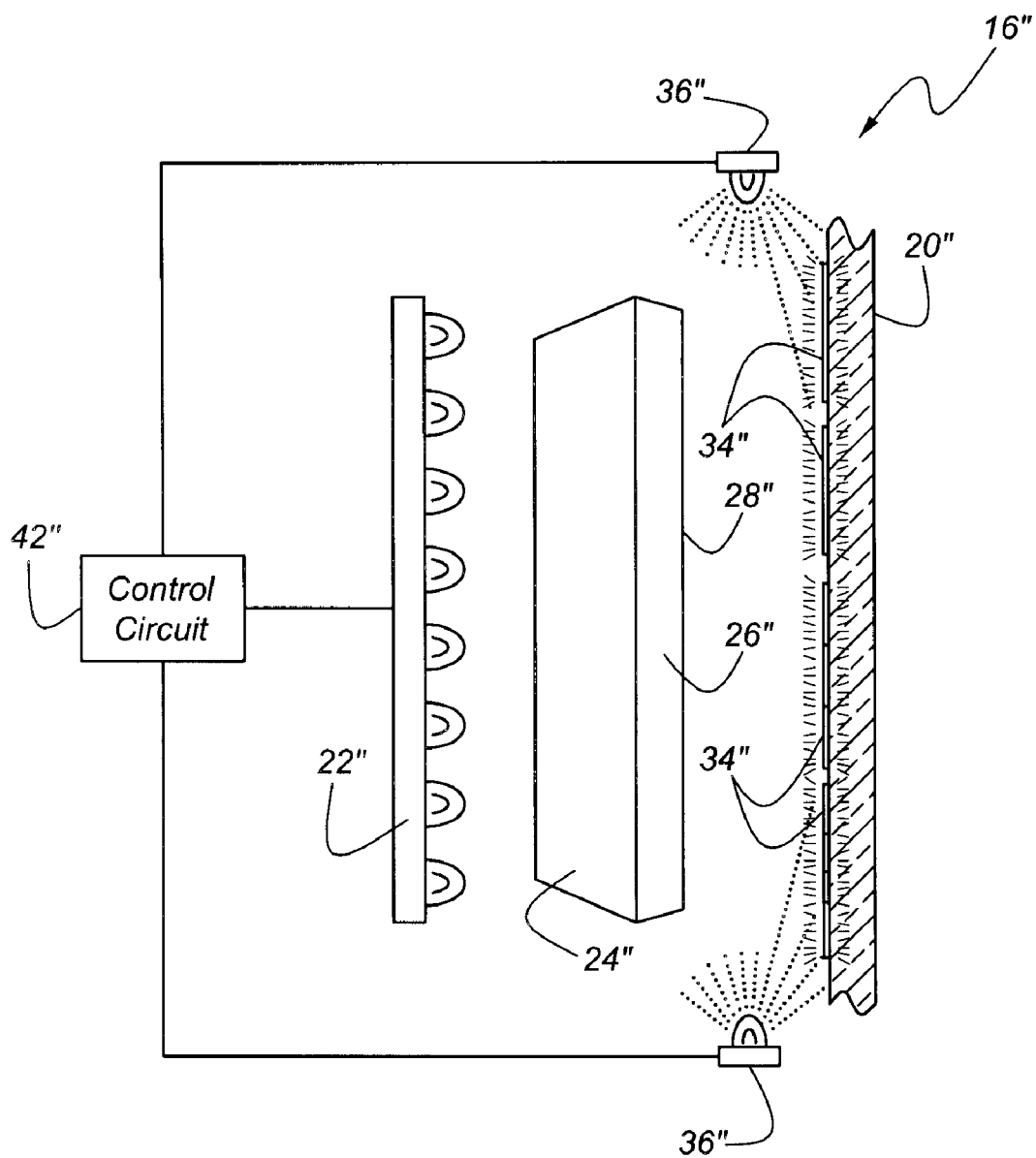
FIG. 6 is a schematic view showing a second alternative embodiment wherein the phosphor-coated indicia are affixed to the inside of the ultraviolet screen.

In FIG. 6, a second alternative embodiment of the subject invention is illustrated in schematic form. For convenience, double prime (") designations will be used with previously introduced reference numerals. As in previous embodiments, the CHMSL assembly 16" includes a primary light source 22" positioned adjacent a collector 24" and diffuser 26" having an exit face 28". A UV light source 36" is likewise provided. In this example, the phosphor-coated indicia 34" is applied directly to the inner surface of the light transmissive screen 20". Thus, the transparent plate 30 of the preceding example is again eliminated. To address the interchangeability issue, the light transmissive screen 20" can be mounted with some form of interchange mechanism to permit convenient substitution for another light transmissive screen 20" with differently formed phosphor-coated indicia 34". A control circuit 42" is shown electrically interconnecting the primary visible light source 22" and the secondary UV light sources 36" in the manner as previously described.

According to any one of the preceding embodiments, a method for selectively presenting lighted indicia from an automobile 10 can be accomplished. The method comprises the step of containing a primary visible light source 22, a secondary ultraviolet light source 36 and a phosphor-coated indicia 34 within a UV impervious housing 18. The phosphor-coated indicia 34 is irradiated with the ultraviolet light from the secondary UV light source 36 while the primary visible light source 22 is inactive. By this technique, the phosphor-coated indicia 34 is visible to observers outside through a light transmissive screen 20 incorporated into the housing 18. A control circuit automatically de-energizes the secondary UV light source 36 in response to the primary visible light source being energized so that there is no conflict between the two lighting systems operating within a common housing 18. The phosphor-coated indicia 34 is substantially invisible to observers whenever the primary light source 22 is active. Preferably, although not necessarily, the phosphor-coated indicia are mounted on a removable transparent plate 30 or on a removable light transmissive screen 20" so that expressive ideas can be changed from time to time. The step of automatically de-energizing the secondary ultraviolet light source 36 is responsive to a brake-induced vehicle deceleration, such as occurs when a driver depresses the brake pedal.

Obviously, many modifications and variations of the present invention are possible in light of the above teachings. For example, the various features and distinctions among the several embodiments are generally interchangeable one with another. It is, therefore, to be understood that within the scope of the appended claims, the invention may be practiced otherwise than as specifically described.

What is claimed is:

1. A motor vehicle having a rearwardly facing exterior surface, said vehicle comprising:
    a housing having a light transmissive screen presented in a rearwardly facing direction;
    a primary visible light source producing a preponderance of visible light disposed in said housing for projecting visible light along a path toward said light transmissive screen;
    phosphor-coated indicia disposed on a non-opaque support surface in said housing and positioned in said light path so that visible light projected by said primary visible light source passes through both said phosphor-coated indicia and said non-opaque support surface on its path toward said light transmissive screen;
    a secondary ultraviolet light source producing a preponderance of UV light within said housing and selectively energized for projecting UV light onto said phosphor-coated indicia to produce a visually interesting display through said light transmissive screen to viewers positioned rearwardly of said vehicle;
    wherein said phosphor-coated indicia is transparent and substantially invisible in the non-energized state so as to be practically undetectable to an outside observer; and
    wherein said vehicle includes a rear window, said light transmissive screen being visible through said rear window and said primary visible light source being operable with a brake light system.

2. The vehicle of claim 1 wherein said housing is fabricated from a UV impervious material.

3. The vehicle of claim 2 wherein said light transmissive screen includes a UV blocking agent.

4. The vehicle of claim 1 wherein said light transmissive screen includes an inner surface contained within said housing, said phosphor-coated indicia disposed on said inner surface of said light transmissive screen.

5. The vehicle of claim 1 further including a translucent light dispersion member disposed in said light path in said housing.

6. The vehicle of claim 5 wherein said phosphor-coated indicia is disposed on said translucent light dispersion member.

7. The vehicle of claim 1 further including a substantially transparent plate disposed in said housing in said light path.

8. The vehicle of claim 7 wherein said phosphor-coated indicia is disposed on said transparent plate.

9. The vehicle of claim 8 further including an interchange mechanism for removably supporting said phosphor-coated indicia within said housing.

10. The vehicle of claim 1 further including a control circuit electrically interconnecting said primary visible light source and said secondary UV light source, said control circuit operative to automatically de-energize said secondary UV light source while simultaneously energizing said primary visible light source.

11. The vehicle of claim 1 wherein said primary visible light source includes an array of light emitting diodes.

12. The vehicle of claim 1 wherein said secondary UV light source includes a filter for blocking all but a predetermined wave length of UV light.

* * * * *